April 8, 1969 C. A. SHAFFER 3,436,858
AUTOMATIC BAIT RELEASE CASTER
Filed July 14, 1966 Sheet 3 of 3

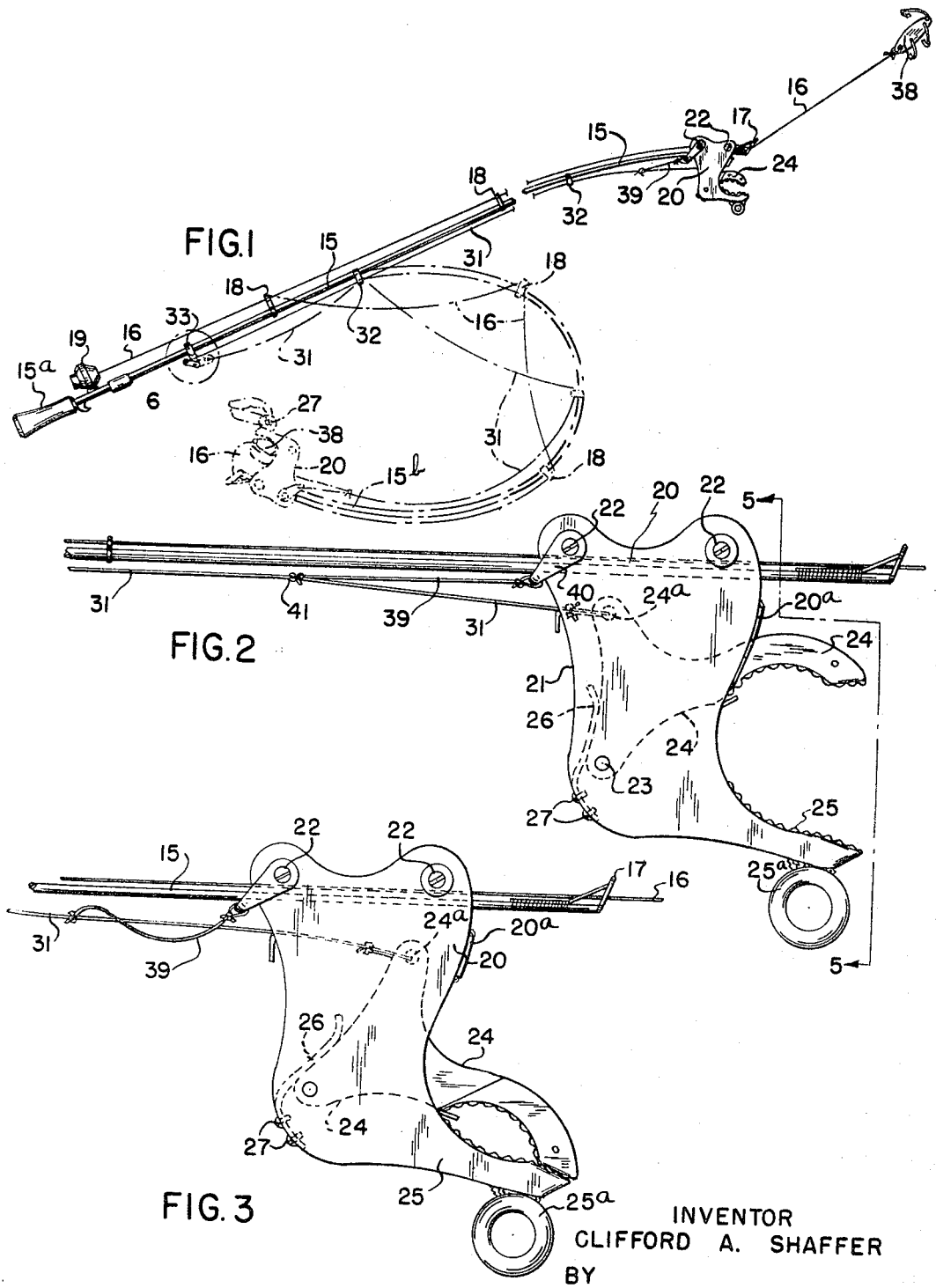

INVENTOR
CLIFFORD A. SHAFFER
BY
Baldwin, Doran & Egan
ATTORNEYS

United States Patent Office 3,436,858
Patented Apr. 8, 1969

3,436,858
AUTOMATIC BAIT RELEASE CASTER
Clifford A. Shaffer, P.O. Box 28,
Newton, Ill. 62448
Filed July 14, 1966, Ser. No. 565,258
Int. Cl. A01k 91/02, 87/04
U.S. Cl. 43—19                                    1 Claim

ABSTRACT OF THE DISCLOSURE

Near the tip end of a resilient casting rod, bait holding jaws are mounted and biased toward bait clamping position but having a jaw opening control line extending from a movable one of the jaws to a point on the rod near the butt end. A control line operating means is manipulatable by an operator holding the butt end of the rod between a first position where the control line is slack and the holding jaws are closed and a second position where the control line is taut when the rod is substantially straight and the holding jaws are moved to their open bait releasing position. The operator places the bait between the holding jaws in clamped position, bends the rod, places the control line operating means in its second position, makes a cast by releasing the bent rod which whips the bait in an arc, the bait being then released when the rod reaches a substantially straight position with the control line taut, at which time this tight line prevents whiplash of the tip end of the rod, after which the operator may place the control line operating means in its first position to play a fish in the normal manner.

---

This invention relates to a fishing bait caster with automatic release therefor wherein the bait is cast by bending and then releasing the resilient tip end of a fishing rod.

One of the objects of this invention is to materially reduce the space a fisherman normally requires in bait casting, and to do this in a manner that permits the fisherman to cast his bait under a low overhang or through narrow tree openings with a minimum chance of line entanglement.

Another object of the invention is to give suitable length to the cast as great as or superior to the conventional overhead cast, and at the same time permit the fisherman to cast using the present invention, or in the conventional manner, without any equipment change or delay whatsoever.

Another object of this invention is to release the bait automatically and at the most effective moment in the use of the present invention.

Other objects and advantages of this invention will be apparent from the accompanying drawings and description and the essential features thereof will be set forth in the appended claims.

In the drawings,

FIG. 1 is an elevational view of a fishing rod equipped with this invention with a dot-dash showing of the tip end of the rod bent in the use of the present invention;

FIG. 2 is an elevational view of the bait holder at the outer end of the fishing rod of FIG. 1 with the bait holder enlarged and with the jaws thereof in open position;

FIG. 3 is a view similar to FIG. 2 but with the jaws of the bait holder in closed position;

FIG. 11 is an enlarged perspective view showing the structure in FIGS. 9 and 10 for controlling the tight or loose condition of the trip line; while

The modern fiber glass reinforced plastic fishing rod is highly resilient. This inherent quality produces a decidedly strong and fast reaction when the tip end of the rod is retracted to or towards the butt or hand grip end and released. The present invention utilizes a bait releasing holder secured to the rod near its tip end and means secured to the rod and operatively connected to the bait holder and responsive to straightening of the tip end of the rod, after pre-bending, to release the bait from the bait holder. Various types of bait holder and various means for releasing the bait holder responsive to straightening of the tip end of the rod might be used. One embodiment, with a slight modification, is shown herein for carrying out this invention.

Figures 5, 8:
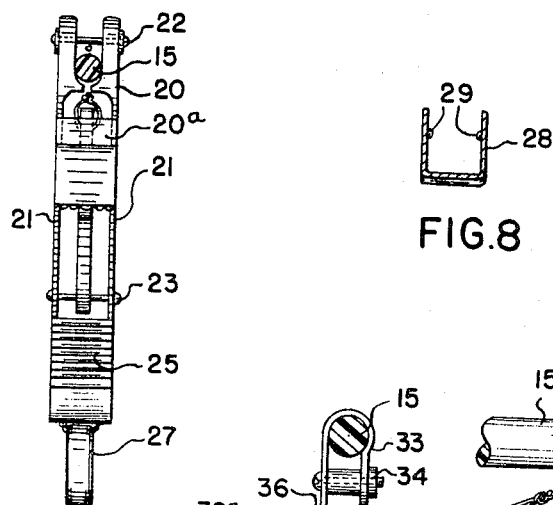
FIG. 5 is an end elevational view taken along the line 5—5 of FIG. 2.
FIG. 8 is a sectional view taken along the line 8—8 of FIG. 4 showing the adapter only.

In FIG. 1, there is shown a fishing rod 15 having a hand grip or butt end 15a and a resilient tip end 15b. A fishing line or bait line 16 is threaded through a tip loop 17 and other loops 18 along the top of the rod in the usual manner. Near the grip end of the rod is mounted a reel 19 for controlling the line 16. This invention involves a bait releasing holder 20 fixed to the rod near the tip end thereof. Referring to FIGS. 2, 3 and 5, the holder 20 is shown constructed of a light but strong sheet plastic material and having parallel side walls 21 rigidly connected by cross connecting walls 20a and 20b. The holder is tightly secured to the rod 15 by two screws or rivets 22 near the upper edge of the holder. Pivot pin 23 is mounted in side walls 21. Pivotally mounted on this pin is a movable jaw 24 which oscillates toward and away from a fixed jaw 25 which joins the side walls 21 of the holder near the bottom. Suitable means such as leaf spring 26 is fixed to the holder at 27 in position to bear against the movable jaw 24 and urge it toward the closed position shown in FIG. 3. Preferably the lower jaw is provided with a finger grip 25a for its manipulation as will be later described.

Figure 4:
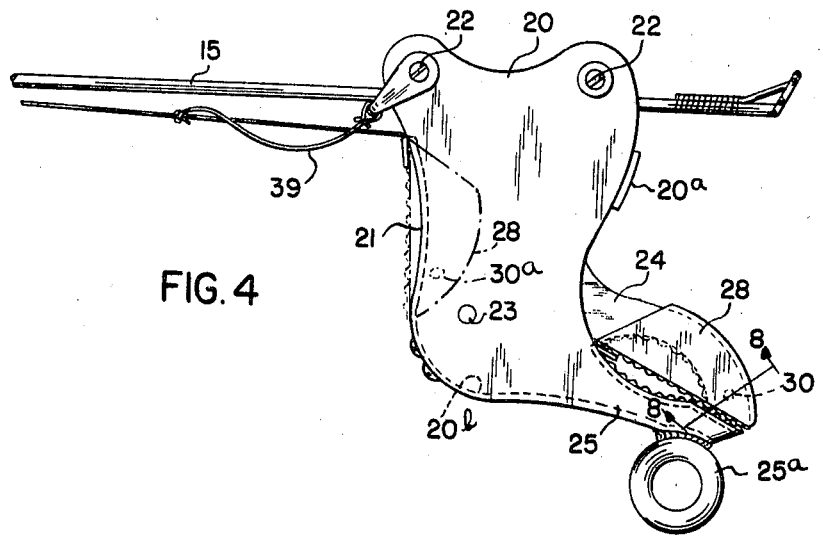
FIG. 4 is a view similar to FIG. 3 showing the use of an adapter on the bait holder jaw.

The structure shown in the jaws 24 and 25 is for the purpose of gripping the usual casting plug but adapters may be provided if desired as shown in FIG. 4 to grip baits of other character. Such an adapter, shown in FIG. 8 in section, is marked 28 and is shown in position on jaw 24 in FIG. 4. The adapter is U-shape in section and preferably provided with projections 29 arranged to snap into dimples 30 in jaw 24 to hold the adapter in place. A similar adapter may be provided for jaw 25 if desired. The adapter 28 may be stored in the dot-dash position shown in FIG. 4 with the projections 29 engaging suitable dimples 30a in the holder side walls 21.

Means is provided for automatically releasing bait from the baith older 20 as the pre-bent tip end of the rod moves into the straightened position. In this embodiment, this involves a trip line 31 secured through an opening 24a in the jaw 24 as shown in FIGS. 2 and 3 and supported in loops 32 on the underside of the rod 15 as shown in FIG. 1. The opposite end of the trip line 31 is secured to the rod 15 pretty well down toward the hand grip and preferably as shown herein in such a manner to permit adjustment of the trip line 31 between taut and loose positions controlling the position of the jaw 24 of the bait holder. This construction is shown more clearly in FIGS. 6 and 7 and herein embodies a generally U-shape clip 33 snugly fastened to the rod 15 by means of a clamp screw connection 34. One arm of the clamp extends downwardly as shown at 33a and supports a pivot pin 35 upon which is pivotally mounted an arm 36. The trip line 31 is connected in an opening 37 near the free end of the arm 36. Knob 36a is for manipulation of arm 36. The length of the arm 36 and of the trip line 31 is so adjusted that in the dot-dash position of FIG. 6 and with rod 15 straight, the trip line 31 is in minimum tension, herein designated "taut," and permits the closing of the jaws 24 and 25 as seen in FIG. 3. At this time brake line 39, if used, is loose as seen in FIG. 4. In the full line position of FIG. 6, the arm 36 swings over center relative to the pivot 35 and holds the trip line 31 in a tight position which moves jaw 24 to an open position as shown in FIG. 2 when the fishing rod is nearly straight as shown in full lines in FIG. 1. At this time brake line 39, if used, will be maximum tight. The movement of the arm 36 in clockwise direction as shown in FIG. 6 is limited by engagement of the trip line 31 beneath the clamp screw fixture.

Figures 6, 7:
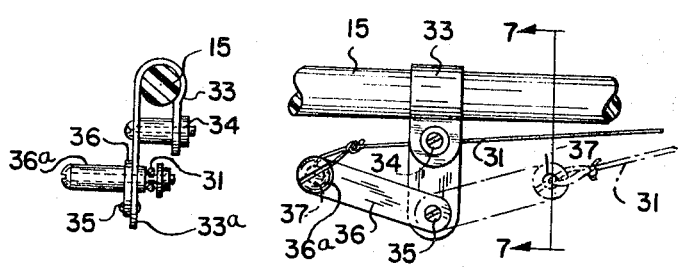
FIG. 6 is an enlarged view of the area within the circle 6 of FIG. 1.
FIG. 7 is sectional view taken along the line 7—7 of FIG. 6.

When the operator desires to utilize the invention thus far described, with arm 36 in the dot-dash position of FIG. 6, he places the bait in the jaws of holder 20 while the rod is fully extended. He then grasps the ring 25a of the bait holder 20 in his thumb and first finger as shown in broken lines in FIG. 1 and bends the resilient tip 15b of the rod back toward him at which time the trip line 31 is in a loose condition extending across the cords of the bent rod as shown in FIG. 1 in dot-dash lines. Of course at this time the bait plug is secured to the fishing line 16 in the usual manner. At the same time, the operator moves the arm 36 from the dot-dash position of FIG. 6 to the full line position so as to place the trip line in proper condition to open the bait holder at the proper moment. To cast the bait, the operator then releases the ring 25a from his thumb and finger permitting the whip action of the resilient tip 15b to swiftly move the rod tip end from the dot-dash position of FIG. 1 toward the full line position of FIG. 1. As the tip end of the rod approaches the fully straightened position, the trip line 31 tightens as shown in FIG. 2 so as to open the jaw 24 which quickly thereafter releases the bait and permits the whip action of the tip end of the rod to throw the bait outwardly as shown in full lines in FIG. 1.

When this invention is practiced, without line 39, as just described, if upon releasing the bait holder there occurs a severe and unpleasant whipping or whip lash action of the tip end of the fishing rod, this whipping action may be overcome by use of a brake line 39. As shown, this line is connected at one end to an arm 40 which is in fixed position on the rivet or screw 22. The other end of this line is connected at 41 to the trip line 31, although this could be a separate line all the way back to a position connected to the fish rod at the point 33 or other suitable point. Actually, from the point 41 back to the clamp 33 the brake line and the trip line are the same cord. The length of this brake line 31–39 is such as to be pulled tight as the tip end of the fishing rod reaches substantially a straight line position. This avoids the whipping action previously mentioned. It will be noted that the control arm 36 controls the tight or loose condition of the brake line 39 as well as having an effect on the trip line 31. Once the cast is made, the control arm or lever 36 is flipped back into the relaxed position as shown in dot-dash lines in FIG. 6 whereupon, if a strike is made, there is no distortion in the "feel" of the rod. The reel and all other usual fishing elements of the rod are then manipulated exactly as one has always done in conventional equipment with no change at all. There is no way for interference to take place between the bait line 16 and the trip and brake lines 31 and 39. Also, without removing the equipment of this invention from the rod 15, it may be used in the conventional manner for casting.

A modification of the embodiment just described is shown in FIGS. 9 through 12. The only difference in this embodiment is near the handle grip end of the rod and only those changes necessary to understand this departure from the already described form will be given here.

Figure 9:
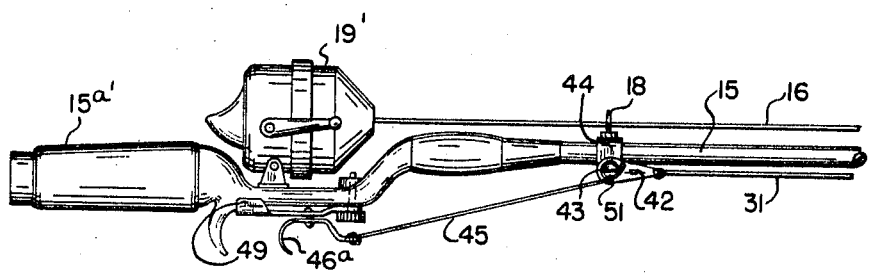
FIG. 9 is an enlarged view of structure adjacent the butt end of a fishing rod in a second embodiment of the invention showing the trip line in relaxed position.

In FIG. 9 is shown the fishing rod 15 with the resilient tip and carrying the bait holder 20, all as previously described. The handle grip end 15a' is a standard handle and is equipped with a reel 19' which performs the function of the reel 19 previously described herein. The only change in this form of the invention is in the arrangement of the arm 42 which is for the purpose of regulating the tension of the combined trip and brake line 31 in place of the arm 36 previously described, together with the control for this arm. The arm 42 is pivotally mounted at 43 in a generally U-shape clip 44 which is securely clamped to the rod 15 by the pivot means 43 which combines with a clamping screw for this purpose. The line 31 is secured to the free end of the arm 42. For control of the arm 42, a line 45 is connected to arm 42 near the pivot point 43 and carried back to a location handy to the operator's hand when he is grasping the hand grip 15a'. An actuator 46 is slidably mounted in a slot 47a of a bracket 47 which is secured to the handle of the fishing rod by means of a screw 48 at the front end passing through a hole 48a in the bracket and a pair of ears 49 at the rear end of the bracket which embrace the handle of the fishing rod so as to prevent rotation of the bracket 47 around the screw 48. A rivet 50 secures the actuator 46 in the slot 47a with sufficient play to allow reciprocation of the actuator 46 forwardly and rearwardly in the bracket 47. The forward position of the arm 42 is shown in FIG. 9 which corresponds to the loose condition of line 31 as in the previously described form herein. In this position of the parts, the line 45 is wrapped about a pin 51 which extends outwardly from the combined pivot and clamp structure 43 as clearly shown in FIG. 12.

Figure 10:
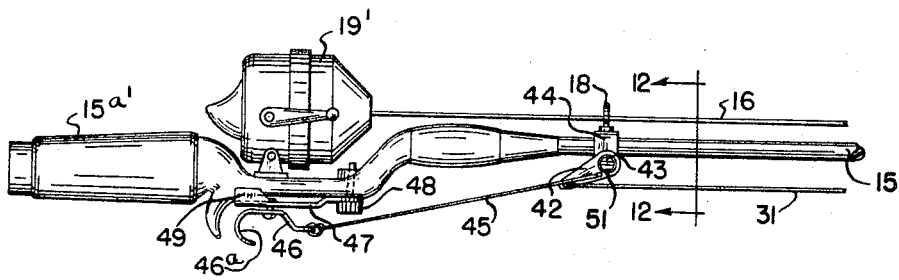
FIG. 10 is a view similar to FIG. 9 showing the trip line in taut position.
Figure 11:
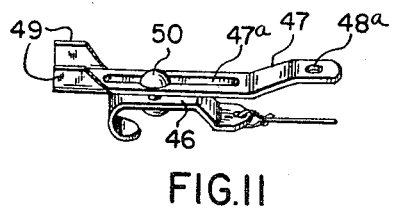
Figure 12:
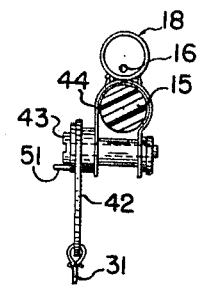
FIG. 12 is an enlarged sectional view taken along the line 12—12 of FIG. 10.

The operation of this modification should now be clear. When the finger grip 46a is released as shown in FIG. 9, any pull on line 31 will move the arm 42 to the relaxed position shown in that view. When operator desires to tighten the line 31, he puts his finger in the finger grip 46a of the actuator 46 and pulls the same toward him which pulls on the line 45 and moves the arm 42 in a clockwise direction from the position of FIG. 9 to the position of FIG. 10. In operation, the position of FIG. 10 is held until the bait is cast as previously described herein, after which the operator releases the actuator 46 whereupon the arm 42 returns to the position of FIG. 9 to restore the normal "feel" to the use of the rod in playing the fish.

What is claimed is:

1. A fishing rod accessory in the form of a bait casting arrangement including cooperating relatively movable bait holding jaws fixed near the tip of a resilient casting rod and having bait clamping and bait releasing positions, a fishing line extending from said bait and along said rod to the butt end thereof, a control line means extending from one of said jaws to a point on said rod near the butt end thereof, said control line means having a connection with said one jaw such that a pull from the butt-directed end thereof causes opening of said jaws and control means having an operating connection with said control line means and having a first position where said control line means is slack when said rod is substantially straight and said holding jaws are in bait clamping position, and said control means having a second position where said control line means is taut when said rod is substantially straight and said one holding jaw is moved to bait releasing position and said control means taut line prevents rod whiplash, and said control means being sufficiently close to said butt end of said rod to be manipulated between said first and second positions by an operator holding the butt end of said rod, whereby an operator may place the bait between said jaws in its clamping position, bend said rod, place said control means in its second position, make a cast releasing said bent rod to whip said bait in an arc, said bait being then released when said rod reaches a substantially straight position with said control line means taut at which time said taut control line means prevents whiplash of the tip end of said rod, after which the operator may place said control means in its first position to play a fish, caught by the bait, in a normal manner.

References Cited

UNITED STATES PATENTS

| | | | |
|---|---|---|---|
| 943,494 | 12/1909 | Venn | 124—7 |
| 2,180,781 | 11/1939 | Taylor | 43—25 |
| 2,381,089 | 8/1945 | Tweit | 43—19 |
| 2,709,315 | 5/1955 | Walter | 43—24 |
| 3,053,004 | 9/1962 | Baker | 43—25 |
| 3,143,823 | 8/1964 | Brown et al. | 43—19 |

FOREIGN PATENTS 79,894   1/1963   France.

WARNER H. CAMP, *Primary Examiner.*

U.S. Cl. X.R.

43—25